United States Patent [19]

Rousset

[11] 3,918,559

[45] Nov. 11, 1975

[54] CAMMING MECHANISM FOR A BRAKE OR CLUTCH DEVICE

[76] Inventor: Louis Rousset, 115 Avenue B, Brownsville, Tex. 78520

[22] Filed: Oct. 17, 1974

[21] Appl. No.: 515,547

[52] U.S. Cl............. 192/54; 192/93 R; 188/106 R; 188/140 A
[51] Int. Cl.². F16D 43/20; F16D 65/14; B60T 7/12
[58] Field of Search............ 192/54, 55, 93 R, 93 A, 192/93 B; 188/18 A, 343, 140 A, 106 R

[56] References Cited
UNITED STATES PATENTS

| 203,808 | 5/1978 | Williamson | 192/93 A |
|---|---|---|---|
| 1,429,280 | 9/1922 | Godfrey | 192/93 A X |
| 2,711,237 | 6/1955 | Wylie | 192/54 X |
| 2,985,113 | 5/1961 | Cotesworth | 192/93 A X |
| 3,289,800 | 12/1966 | Strong | 192/93 A X |
| 3,425,519 | 2/1969 | Frigger | 188/106 R |

Primary Examiner—Samuel Scott
Assistant Examiner—Lance W. Chandler
Attorney, Agent, or Firm—Donald M. Sandler; Martin P. Hoffman; James H. Ewing

[57] ABSTRACT

A mechanism for a brake or clutch device has a pair of co-linear discs mounted for relative axial displacement. Operation of an actuator cams one of the discs into frictional engagement with the other for coupling the discs together. If overrunning occurs, cam means associated with the other disc becomes effective to axially displace the latter into tighter engagement with the first mentioned disc which increases the coupling between the discs.

10 Claims, 5 Drawing Figures

CAMMING MECHANISM FOR A BRAKE OR CLUTCH DEVICE

This invention relates to a mechanism suitable for use as part of a brake or a clutch device, and more particularly to a mechanism in which the braking or clutching action is automatically increased by the degree to which the device tends to over-run.

In a well-known braking arrangement for a power wheel, the latter is provided with a friction disc that is normally spaced from an axially displaced non-rotatable disc. Upon operation of an actuator, a cam surface thereon engages the non-rotatable disc axially displacing it into engagement with the friction disc thus braking rotation of the power wheel. If the power wheel tends to over-run, braking pressure can be increased by further operation of the actuator.

In a comparable clutch device using co-linear input and output shafts, each having separate friction discs mounted thereon, torque is coupled from the input to the output shaft by operating an actuator that axially displaces the discs into engagement. If the clutch tends to over-run or slip, an increase in pressure between the discs is achieved by further operation of the actuator.

With both a brake and clutch device of the type described above, over-running is often permissable, but situations exist where it is desired to increase the braking or clutching action without further operation of an actuator. In such case, the devices of the prior art are not satisfactory.

It is therefore an object of the present invention to provide a new and improved mechanism suitable for use as a part of a brake or clutch device wherein the mechanism has the capability of automatically increasing the braking or clutching action.

Briefly, the basic mechanism of the present invention includes a member associated with one of the discs and mounted for rotation relative thereto, and cam means interposed between the member and the disc associated therewith for converting relative rotation to axial displacement of the disc into frictional engagement with the other disc thereby coupling the discs together. The relative rotation between the member and the disc, which serves to increase the braking or clutching action, arises in the case of a braking device when rotational energy in the power wheel exceeds the energy absorbed in the discs; and in the case of a clutch device, when the load torque exceeds the output torque of the device.

Specific embodiments of the invention are illustrated by way example in the accompanying drawings wherein.

Figure 1:
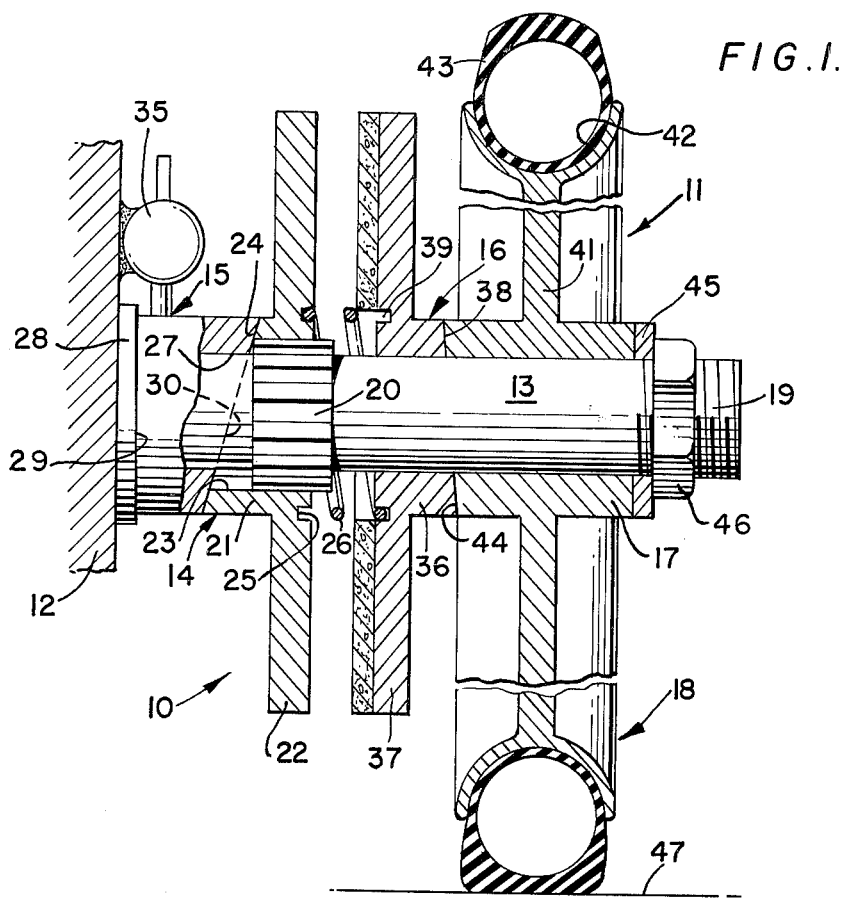
FIG. 1 is an elevation partially in section of a mechanism according to the present invention used as part of a brake.

Referring now to FIG. 1, reference numeral 10 designates a mechanism according to the present invention used as a brake device 11 for a vehicle 12. Mechanism 10 comprises an axially extending shaft 13 secured to the frame of the vehicle, members 14, 15, 16 and 17, and power wheel 18. Shaft 13 terminates in a threaded free end 19 and is provided with an enlarged spline section 20 adjacent the cantilevered end of the shaft.

First member 14 comprises a hub 21 and an integral disc 22 extending radially from the hub which has a splined bore 23 slidably receiving the spline section 20 on the shaft. The free end of hub 21 facing the frame of vehicle 12 has an annular surface 24 that lies in a plane inclined with respect to the axis of bore 23 in the hub. The opposite surface of the hub is provided with a counter bore 25 that serves as a seat for compression spring 26 whose purpose is described below.

Second member 15 is in the form of a collar having a central bore rotatably receiving shaft 13 and interposed between a thrust bearing 28 resting against the frame of the vehicle and the first member 14. The axial end of member 15 facing the frame of the vehicle has an annular surface 29 abutting the thrust bearing while the opposite axial end of this member has an annular surface 30 that is inclined to the axis of the shaft at the same angle as the surface 24 on member 14.

Projecting radially from the member 15 is a link 31 having a slot 32 for slidably receiving a pin 33 carried by a rod 34 projecting from an operating cylinder 35 mounted on the frame of the vehicle. Cylinder 35, for example, may be an hydraulic cylinder allowing the rod 34 to be selectively extended or retracted as indicated in FIG. 3 for the purpose of imparting rotational movement to the member 15.

Third member 16 comprises a hub 36 carrying an integral disc 37 extending radially therefrom in the same manner as disc 22. The axial end of hub 36 remote from the frame of the vehicle has an annular surface 38 inclined with respect to the axis of the shaft while the axial end of the hub facing the frame is provided with a counter-bore 39 for receiving spring 26. Preferably, disc 37 is provided with a friction facing 40. Alternatively, the disc 22 may be provided with the facing instead.

Fourth member 17 constitutes the hub of power wheel 18 which has a series of radially extending spokes 41 connected to the hub and terminating in a grooved periphery 42 providing a seat for pneumatic tire 43. The axial end of member 17 facing the frame of the vehicle is provided with an annular surface 44 inclined to the axis of the shaft at the same angle as the angle of inclination of the annular surface 38. Finally, the axial end of hub 17 remote from the frame of the vehicle is squared off and abuts thrust bearing 45 which is limited against axial displacement away from the frame by means of nut 46 threaded on the free end 19 of the shaft and locked against removal.

Figure 3:
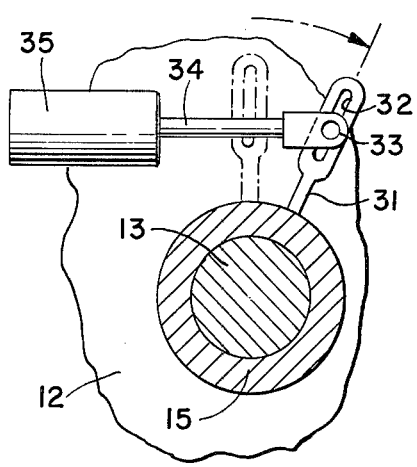
FIG. 3 is a view taken along the section 3—3 of FIG. 2.

As can be seen from inspection of FIG. 1, spring 26 normally retains the discs 22 and 37 spaced apart when the cylinder 35 is not actuated and the link 31 is in the position in broken lines in FIG. 3. In such case, the vehicle is free to move by reason of the rotation of the power wheel 18 due to the engagement of the tire 43 on ground surface 47.

Under normal conditions illustrated in FIG. 1 when the cylinder 35 has not been operated, surfaces 24 and 30 on the members 14 and 15 are in contact with each other thereby allowing spring 26 to hold disc 22 spaced from the friction material on disc 37. Spring 26 also maintains surface 38 on member 16 engaged with surface 44 on member 17 and both the power wheel 18 and the member 16 are freely rotatable as a unit on shaft 13.

Figure 2:
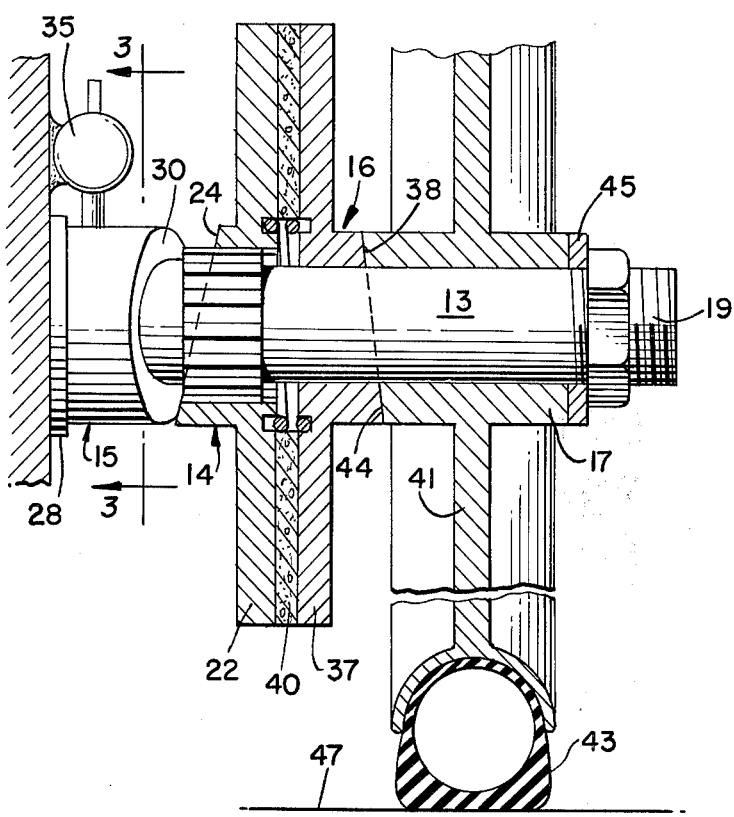
FIG. 2 is a view similar to that shown in FIG. 1 but showing the brake in operation in preparation for an automatic increase of the braking action.

When cylinder 35 is actuated in order to rotate member 15, the surfaces 24 and 30 operate as a first cam means for the purpose of axially displacing member 14 on the splines 20 against the bias of spring 26 until disc 22 engages the friction material on disc 37 as indicated in FIG. 2. Braking action now occurs as the rotation of disc 37 and hence the power wheel is slowed. If the torque applied to disc 37 by the power wheel 18 exceeds the torque absorbed due to the friction between the discs 22 and 37, the member 17 will tend to rotate relative to member 16. In such case, surface 38 on member 16 and surface 44 on member 17 will act as second cam means which will be effective under the circumstances to axially displace the member 16 towards the member 21 thus increasing the axial pressure between the discs 22 and 37 and increasing the braking action. In this manner, excess radial energy in the power wheel is transferred into braking power.

Cylinder 35 is indicated as being a hydraulic cylinder but any type of means for operating the rod 34 could be used. For example, cylinder 35 may be pneumatic or the rod 34 could be moved by direct manual pressure. In addition, thrust bearings 28 and 45 are shown schematically in FIG. 1 and it should be understood that suitable bearings would be utilized on members 16 and 17 to accommodate their mounting on shaft 13.

Figure 4:
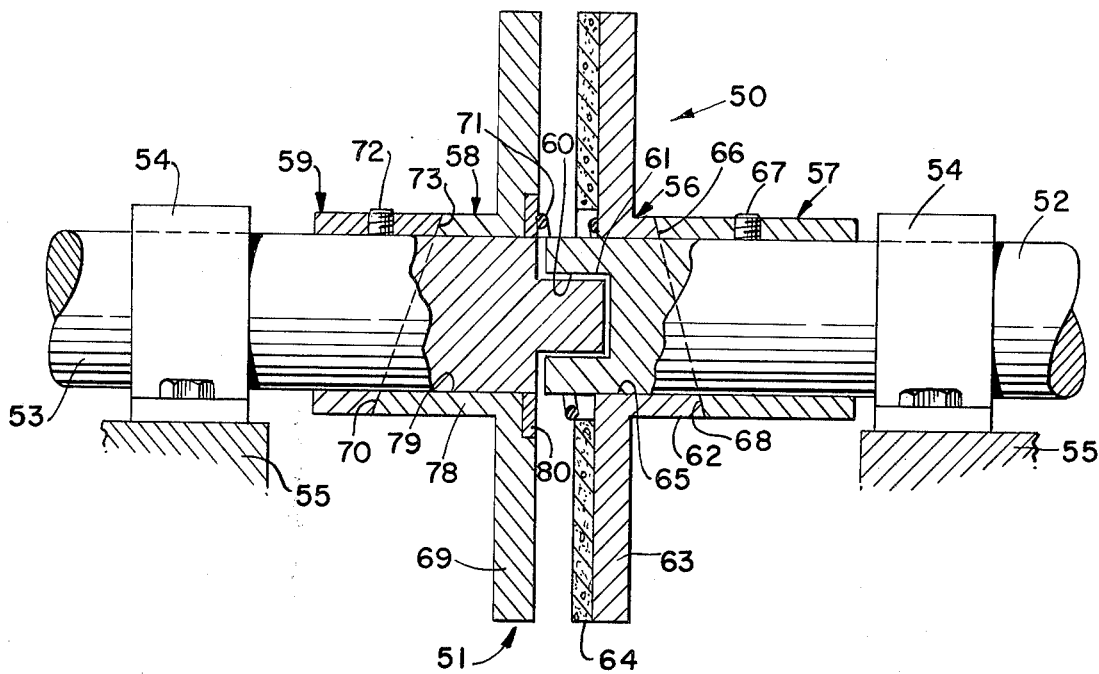
FIG. 4 is a side view partially in section of a mechanism according to the present invention used as a clutch device.
Figure 5:
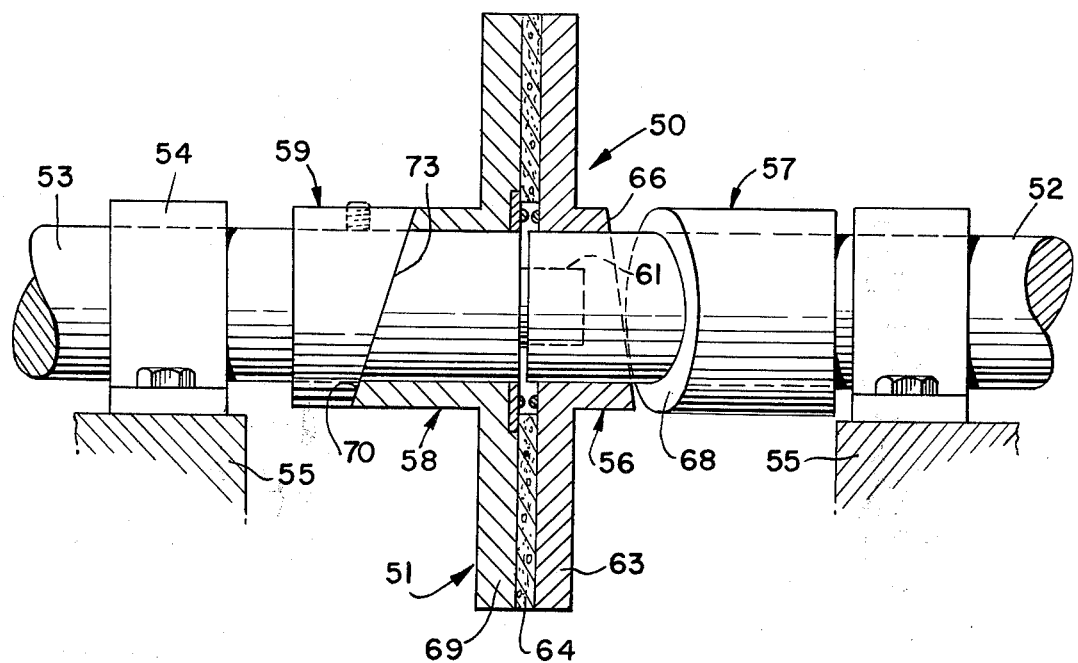
FIG. 5 is a view similar to that shown in FIG. 4 but showing the clutch in engagement in preparation for an automatic increase of the clutching.

Referring now to FIG. 4, reference numeral 50 designates a mechanism according to the present invention used as a clutch device 51. Mechanism 50 comprises a pair of co-linear shafts 52 and 53 mounted for rotation in bearings 54 fixed to a frame 55, and members 56, 57, 58 and 59. Shaft 52 constitutes the input and is provided with a counter bore 60 in one axial end for rotatably receiving a stub 61 integral with the output shaft 53. A bearing may be utilized between the stub 61 and counter-bore 60.

First member 56 comprises a hub 62 carrying a radially extending disc 63 on one surface of which is provided friction material 64. Hub 62 contains a bore 65 rotatably receiving the shaft 52 and one axial end of the hub is provided with an annular surface 66 that is inclined with respect ot the axis of shaft 52 and 53.

Second member 57 is axially fixed to the shaft 52 by a set screw 67 or other expedient and has an annular surface 68 facing surface 66 inclined with respect to the axis of the shafts 52 and 53 at the same angle as the inclination of surface 66.

Third member 58 comprises a hub 78 and an integral disc 69 extending radially therefrom. Bore 79 in hub 78 rotatably receives shaft 53 and one axial end of the hub is provided with an annular surface 70 inclined with respect to the axis of the shafts 52, 53. The other axial end of hub 68 is provided with a thrust bearing 80 that provides a seat for spring 71 whose function is to bias the discs 63 and 69 apart.

Fourth member 59 is non-rotatably mounted on shaft 53 by means of a set screw 72 or other expedient and has an annular surface 73 inclined with respect to the axis of shafts 52 and 53 at the same angle as the inclination of surface 70.

In one mode of operation, the output shaft 53 is stationary and the input shaft 52 rotates at an idling speed with spring 71 serving to maintain surfaces 66 and 68 in engagement and to maintain the separation of discs 63 and 69. When the angular velocity of shaft 52 is increased, relative rotation between the member 56 and 57 will occur, the surfaces 66 and 68 acting as first cam means by which the relative rotation effects axial displacement of member 56 until the friction material on disc 63 engages disc 69 transferring torque from the input shaft 52 to the members 58 and 59 and thence to the output shaft 53. In the event that the load on shaft 53 is greater than the torque being transferred between discs 63 and 69, the friction between these discs will cause member 58 to rotate relative to member 59. In such case, the surfaces 70 and 73 act as second cam means for effecting the axial displacement of member 58 towards member 56 with the result that disc 69 is urged into tighter engagement with the frictional material on disc 63. The situation continues until shaft 53 begins to rotate in response to the increase in angular velocity of shaft 52.

In another mode of operation, the input shaft 52 is stationary and the output shaft 53 has a torque applied as in the case of the device being applied to a bicycle. In this mode of operation the clutch works in reverse causing the power source to be used for braking purposes. In this mode, an increase in angular velocity of shaft 53, as when the speed of a bicycle begins to increase, will cause relative rotation to occur between members 58 and 59. The result is that the surfaces 70 and 73 on these members converts the rotation of member 58 relative to member 59 into axial displacement of member 58 until disc 69 engages the frictional material on disc 63 thereby transferring torque into the members 56 and 57. If the input shaft 58 is maintained stationary, a braking effect is exerted on the output shaft 53.

From the above description it can be seen that the mechanism according to the present invention is suitable for use as part of a brake or a clutch device such that the braking or clutching action is automatically increased by a tendency of the mechanism to over-run.

I claim:
1. A mechanism comprising:
   a. an axially extending shaft means carrying a pair of axially displaced members the first of which has a disc thereon;
   b. a third member on the shaft and having a disc thereon;
   c. spring means interposed between the pair of members and the third member for biaisng the latter away from the pair of members;
   d. first cam means on the pair of members responsive to rotation of the second member of the pair for urging the first member toward the third member against the bias of the spring and causing the discs to engage each other;
   e. a fourth member on the shaft means adjacent the third member and rotatable thereon relative to the latter; and
   f. second cam means on the third and fourth members responsive to relative rotation therebetween for urging the third member toward the first member so that the discs are urged into tighter engagement.

2. A mechanism according to claim 1 wherein the shaft means is constituted by a shaft cantilevered to a frame and the fourth member comprises a hub rotatable on the shaft and a power wheel; the mechanism including a thrust bearing on the shaft for limiting axial displacement of the hub in a first direction that rotation of the hub on the shaft causes the second cam means to urge the third member away from the thrust bearing; the spring means being effective to maintain the discs separate and to cause the third and fourth members to rotate together when the pair of members have a first predetermined angular relationship on the shaft.

3. A mechanism according to claim 2 wherein the power wheel is a ground engaging wheel by which the frame is movable over the ground.

4. A mechanism according to claim 3 comprising:
   a. means mounting the first member on the shaft for effecting axial displacement of the first member but preventing its rotation;
   b. means mounting the second member on the shaft for effecting rotation of the second member but preventing its axial displacement in a direction opposite to the first direction; and
   c. means to rotate the second member on the shaft from a first predetermined angular position to a second predetermined angular position for causing the first cam means to axially displace the first member until the disc thereon engages the disc on the third member whereby the mechanism acts as a brake for the ground engaging wheel.

5. A mechanism according to claim 4 wherein one of the discs is provided with friction material on the axial face engageable by the other disc.

6. A mechanism according to claim 2 wherein the first and second cam means are constituted by surfaces on the members inclined with respect to the axis of the shaft.

7. A mechanism according to claim 1 wherein the shaft means comprises a pair of separate shafts mounted in co-linear relationship and rotatable relative to each other; means rigidly connecting the second member to the first shaft; means mounting the first member on the first shaft for both axial and rotational movement thereon whereby a change in angular velocity of the first shaft causes the first cam means to axially displace the first member toward the third member against the bias of the spring means.

8. A mechanism according to claim 7 including means rigidly connecting the fourth member to the second shaft; means mounting the third member on the second shaft for both axial and rotational movement thereon whereby a change in angular velocity of the second shaft causes the second cam means to axially displace the third member towards the first member against the bias of the spring means.

9. A mechanism according to claim 8 wherein the first and second cam means are constituted by surfaces on the members inclined with respect to the axis of the shaft.

10. A mechanism according to claim 8 wherein one of the discs is provided with frictional material on its axial face engageable by the other disc.

* * * * *